United States Patent
Vitito (10) Patent No.: US 8,203,657 B2
(45) Date of Patent: Jun. 19, 2012

(54) INDUCTIVELY POWERED MOBILE ENTERTAINMENT SYSTEM

(75) Inventor: Christopher J. Vitito, Celebration, FL (US)

(73) Assignee: Audiovox Corporation, Hauppauge, NY (US)

( * ) Notice: Subject to any disclaimer, the term of this patent is extended or adjusted under 35 U.S.C. 154(b) by 809 days.

(21) Appl. No.: 12/216,852

(22) Filed: Jul. 11, 2008

(65) Prior Publication Data

US 2010/0007805 A1    Jan. 14, 2010

(51) Int. Cl.
*H04N 5/64* (2006.01)
*A47C 7/62* (2006.01)

(52) U.S. Cl. ..................................... 348/837; 297/217.3

(58) Field of Classification Search .................. 348/148, 348/837; 297/217.3; 320/108
See application file for complete search history.

(56) References Cited

U.S. PATENT DOCUMENTS

| | | | |
|---|---|---|---|
| 2,652,101 A * | 9/1953 | Samsky et al. ................ 297/114 |
| 3,511,535 A * | 5/1970 | Gunlock ........................ 297/410 |
| 3,964,788 A * | 6/1976 | Kmetyko ....................... 297/395 |
| 4,490,842 A * | 12/1984 | Watanabe ....................... 381/86 |
| 6,092,705 A * | 7/2000 | Meritt ........................... 224/275 |
| 6,216,927 B1 * | 4/2001 | Meritt ........................... 224/275 |
| 6,217,118 B1 * | 4/2001 | Heilig ........................... 297/410 |
| 6,424,055 B1 * | 7/2002 | Hambsch et al. ............ 307/10.1 |
| 6,443,574 B1 | 9/2002 | Howell et al. |
| 6,567,660 B1 | 5/2003 | Wegener |
| 6,606,481 B1 | 8/2003 | Tegler et al. |
| 6,619,605 B2 | 9/2003 | Lambert |
| 6,694,200 B1 | 2/2004 | Naim |
| 6,717,798 B2 | 4/2004 | Bell et al. |
| 6,742,185 B1 * | 5/2004 | Andrews ......................... 725/75 |
| 6,768,523 B2 * | 7/2004 | Cheng et al. ................... 349/58 |
| 6,824,917 B2 * | 11/2004 | Aaltonen et al. ................ 429/97 |
| 6,871,356 B2 * | 3/2005 | Chang ............................. 725/75 |
| 6,883,870 B2 * | 4/2005 | Jost ............................... 297/391 |
| 6,899,365 B2 | 5/2005 | Lavelle et al. |
| 6,973,476 B1 | 12/2005 | Naden et al. |
| 7,040,698 B2 * | 5/2006 | Park et al. .................. 297/217.3 |
| 7,050,124 B2 | 5/2006 | Schedivy |
| 7,062,254 B2 | 6/2006 | Hovestadt et al. |
| 7,084,932 B1 * | 8/2006 | Mathias et al. ............... 348/837 |
| 7,118,240 B2 | 10/2006 | Baarman et al. |
| 7,239,040 B2 * | 7/2007 | Kitazawa ..................... 307/10.1 |
| 7,352,567 B2 * | 4/2008 | Hotelling et al. ........ 361/679.55 |
| 7,360,833 B2 * | 4/2008 | Vitito .......................... 297/217.3 |
| 7,375,492 B2 * | 5/2008 | Calhoon et al. ............... 320/108 |
| 7,407,227 B1 * | 8/2008 | Tuccinardi et al. ......... 297/217.3 |
| 7,440,275 B2 * | 10/2008 | Schedivy ................. 361/679.41 |
| 7,448,679 B2 * | 11/2008 | Chang ........................ 297/217.3 |
| 7,462,951 B1 * | 12/2008 | Baarman ........................ 307/9.1 |
| 7,560,827 B2 * | 7/2009 | Jacas-Miret et al. ........... 307/9.1 |
| 7,597,393 B1 * | 10/2009 | Tuccinardi et al. ......... 297/217.3 |
| 7,612,528 B2 * | 11/2009 | Baarman et al. .............. 320/108 |
| 7,679,578 B2 * | 3/2010 | Schedivy .......................... 345/7 |
| 7,719,408 B2 * | 5/2010 | DeWard et al. ............ 340/425.5 |
| 7,728,551 B2 * | 6/2010 | Reed et al. .................... 320/108 |

(Continued)

FOREIGN PATENT DOCUMENTS

DE    29518369    1/1996

(Continued)

*Primary Examiner* — Eileen D Lillis
*Assistant Examiner* — Charissa Ahmad (57) ABSTRACT

A mobile entertainment system includes a video system designed for reducing energy consumption. The video system includes a battery permitting proximity charging of the video system. A supporting structure supports the video system within a vehicle.

22 Claims, 8 Drawing Sheets

U.S. PATENT DOCUMENTS

| | | | |
|---|---|---|---|
| 7,758,116 B2 * | 7/2010 | Hattori et al. | 297/217.3 |
| 7,780,231 B2 * | 8/2010 | Shalam et al. | 297/217.3 |
| 7,909,396 B2 * | 3/2011 | Vitito | 297/217.3 |
| 7,909,397 B2 * | 3/2011 | Shalam et al. | 297/217.3 |
| 7,948,208 B2 * | 5/2011 | Partovi et al. | 320/108 |
| 2001/0000419 A1 * | 4/2001 | Heilig | 297/410 |
| 2001/0008266 A1 | 7/2001 | Lambert | |
| 2001/0037360 A1 | 11/2001 | Ekkel | |
| 2002/0095680 A1 | 7/2002 | Davidson | |
| 2002/0135974 A1 | 9/2002 | Bell et al. | |
| 2002/0174269 A1 | 11/2002 | Spurgat et al. | |
| 2003/0110057 A1 | 6/2003 | Pisz | |
| 2003/0137584 A1 | 7/2003 | Norvell et al. | |
| 2004/0002359 A1 | 1/2004 | Deas et al. | |
| 2004/0004378 A1 * | 1/2004 | Park et al. | 297/217.3 |
| 2004/0032543 A1 * | 2/2004 | Chang | 348/837 |
| 2004/0061995 A1 | 4/2004 | McMahon | |
| 2004/0086259 A1 | 5/2004 | Schedivy | |
| 2004/0130616 A1 | 7/2004 | Tseng | |
| 2004/0133923 A1 | 7/2004 | Watson et al. | |
| 2004/0189797 A1 | 9/2004 | Todd et al. | |
| 2004/0212957 A1 | 10/2004 | Schedivy | |
| 2004/0227861 A1 | 11/2004 | Schedivy | |
| 2004/0228622 A1 | 11/2004 | Schedivy | |
| 2004/0233374 A1 * | 11/2004 | Yamazaki et al. | 349/153 |
| 2004/0266336 A1 | 12/2004 | Patsiokas et al. | |
| 2005/0005298 A1 | 1/2005 | Tranchina | |
| 2005/0007067 A1 * | 1/2005 | Baarman et al. | 320/108 |
| 2005/0044564 A1 | 2/2005 | Stopniewicz et al. | |
| 2005/0052046 A1 | 3/2005 | Lavelle et al. | |
| 2005/0071375 A1 | 3/2005 | Houghton et al. | |
| 2005/0075783 A1 | 4/2005 | Wolf et al. | |
| 2005/0099548 A1 * | 5/2005 | Vitito | 348/837 |
| 2005/0110913 A1 * | 5/2005 | Vitito | 348/837 |
| 2005/0116943 A1 | 6/2005 | Wohrle et al. | |
| 2005/0120380 A1 | 6/2005 | Wolfe | |
| 2005/0127869 A1 * | 6/2005 | Calhoon et al. | 320/108 |
| 2005/0130585 A1 | 6/2005 | Gnuschke et al. | |
| 2005/0130586 A1 | 6/2005 | Gnuschke et al. | |
| 2005/0166238 A1 * | 7/2005 | Vitito | 725/77 |
| 2005/0216938 A1 | 9/2005 | Brady, Jr. et al. | |
| 2005/0227773 A1 | 10/2005 | Lu et al. | |
| 2005/0258806 A1 | 11/2005 | Janik et al. | |
| 2005/0264051 A1 * | 12/2005 | Lawall et al. | 297/216.12 |
| 2006/0045015 A1 | 3/2006 | Nix et al. | |
| 2006/0070103 A1 | 3/2006 | Vitito | |
| 2006/0074550 A1 | 4/2006 | Freer et al. | |
| 2006/0098238 A1 | 5/2006 | Ylonen | |
| 2006/0107295 A1 | 5/2006 | Margis et al. | |
| 2006/0109388 A1 | 5/2006 | Sanders et al. | |
| 2006/0119151 A1 | 6/2006 | Vitito | |
| 2006/0130099 A1 | 6/2006 | Rooyen | |
| 2006/0138308 A1 | 6/2006 | Davis et al. | |
| 2006/0148577 A1 | 7/2006 | Vitito | |
| 2006/0181982 A1 | 8/2006 | Villevieille et al. | |
| 2006/0184968 A1 | 8/2006 | Clayton et al. | |
| 2007/0052266 A1 * | 3/2007 | Chu | 297/217.3 |
| 2007/0057541 A1 * | 3/2007 | Huang | 297/217.3 |
| 2007/0070259 A1 | 3/2007 | Schedivy | |
| 2007/0091215 A1 * | 4/2007 | Ikunami | 348/837 |
| 2007/0101372 A1 * | 5/2007 | Chang | 725/75 |
| 2007/0171316 A1 * | 7/2007 | Mathias et al. | 348/837 |
| 2007/0182367 A1 * | 8/2007 | Partovi | 320/108 |
| 2007/0222248 A1 * | 9/2007 | Maulden et al. | 296/37.15 |
| 2007/0242172 A1 * | 10/2007 | Macholz | 348/837 |
| 2007/0290536 A1 * | 12/2007 | Nathan et al. | 297/217.3 |
| 2008/0036927 A1 * | 2/2008 | Sitter et al. | 349/1 |
| 2008/0079388 A1 * | 4/2008 | Sarnowsky et al. | 320/103 |
| 2008/0100706 A1 * | 5/2008 | Breed | 348/143 |
| 2008/0157574 A1 * | 7/2008 | LaRussa | 297/217.3 |
| 2008/0170165 A1 * | 7/2008 | Lee et al. | 348/837 |
| 2008/0252798 A1 * | 10/2008 | Vitito | 348/837 |
| 2009/0085383 A1 * | 4/2009 | Hicks et al. | 297/217.3 |
| 2009/0096413 A1 * | 4/2009 | Partovi et al. | 320/108 |
| 2010/0045790 A1 * | 2/2010 | Lynam et al. | 348/140 |
| 2010/0060050 A1 * | 3/2010 | Muirhead | 297/217.4 |
| 2010/0090491 A1 * | 4/2010 | Hipshier et al. | 296/24.34 |
| 2010/0194336 A1 * | 8/2010 | Azancot et al. | 320/108 |
| 2011/0018498 A1 * | 1/2011 | Soar | 320/108 |
| 2011/0181796 A1 * | 7/2011 | Caltabiano et al. | 348/837 |

FOREIGN PATENT DOCUMENTS

| | | |
|---|---|---|
| DE | 202005007826 U1 * | 8/2005 |
| WO | WO02/073574 | 9/2002 |
| WO | WO2007/129029 | 11/2007 |

* cited by examiner

INDUCTIVELY POWERED MOBILE ENTERTAINMENT SYSTEM

BACKGROUND OF THE INVENTION

1. Field of the Invention

The invention relates to a mobile entertainment system. More particularly, the invention relates to an energy efficient mobile entertainment system free from the requirement of a direct line based energy connection to an automobile.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount at various locations within an automobile have also been developed.

These entertainment systems allow multiple individuals to view a variety of different video sources within the same vehicle. However, and as those skilled in the art will certainly appreciate, it is desirable to provide added versatility to these entertainment systems. The present invention attempts to accomplish this by providing a system that is energy efficient and does not require a direct line based energy connection to an automobile.

SUMMARY OF THE INVENTION

It is, therefore, an object of the present invention to provide a mobile entertainment system including a video system designed for reducing energy consumption. The video system includes a battery permitting proximity charging of the video system. A supporting structure supports the video system within a vehicle.

It is also an object of the present invention to provide a mobile entertainment system wherein the power consumption of the video system is less than approximately 2 Amps.

It is another object of the present invention to provide a mobile entertainment system wherein power consumption of the video system is less than approximately 0.5 Amps.

It is a further object of the present invention to provide a mobile entertainment system wherein the video system includes a housing in which a monitor is mounted for viewing by those utilizing the mobile entertainment system, and media content for display upon the monitor is wirelessly transmitted to the video system via a media storage unit mounted within the vehicle.

It is also an object of the present invention to provide a mobile entertainment system wherein the video system is provided with touch screen functionality.

It is another object of the present invention to provide a mobile entertainment system wherein a secondary coil is electrically linked to the battery of the video system for inductive coupling with a primary coil coupled to a power supply circuit of the vehicle.

It is a further object of the present invention to provide a mobile entertainment system wherein a telescoping coupling member electrically links the secondary coil of the video system with the primary coil.

It is also an object of the present invention to provide a mobile entertainment system wherein the telescoping coupling member is composed of a selectively telescoping arm through which an electrical wire extends for linking a distal end of the telescoping arm to the secondary coil of the video system.

It is another object of the present invention to provide a mobile entertainment system wherein the distal end of the telescoping arm is magnetically charged for attraction to a magnetically charged shroud mounted within the vehicle and linked to the primary coil.

It is a further object of the present invention to provide a mobile entertainment system wherein the primary coil is mounted in the seat back of the vehicle in proximity to the secondary coil.

It is another object of the present invention to provide a mobile entertainment system wherein the video system is mounted within a headrest of the vehicle.

It is a further object of the present invention to provide a mobile entertainment system wherein the video system includes a housing in which a monitor is mounted for viewing by those utilizing the mobile entertainment system, and the monitor is an organic LED.

It is also an object of the present invention to provide a mobile entertainment system wherein the supporting structure allows for selective supporting of the video system within the vehicle.

It is a further object of the present invention to provide a mobile entertainment system wherein the supporting structure is composed of a drawer integrally formed within the vehicle.

It is also an object of the present invention to provide a mobile entertainment system wherein the drawer is integrally formed within a headrest of the vehicle.

It is another object of the present invention to provide a mobile entertainment system wherein the drawer includes a transparent front wall.

It is a further object of the present invention to provide a mobile entertainment system wherein the drawer includes a base support and a drawer member, and movement of the drawer member relative to the base support is controlled by a servomotor that selectively moves the drawer member between its closed position and its open position.

It is also an object of the present invention to provide a mobile entertainment system wherein the supporting structure is a slipcover shaped and dimensioned to fit over a headrest.

It is another object of the present invention to provide a mobile entertainment system wherein the slipcover is composed of fabric base structure shaped and dimensioned to fit over the headrest, and includes a zipper allowing for expansion and closure to allow the fabric base structure to fit over the headrest.

It is a further object of the present invention to provide a mobile entertainment system wherein the supporting structure is a recessed support structure into which the video system is snap fit.

It is also an object of the present invention to provide a mobile entertainment system wherein the recessed support structure includes a base support that is fit within a recess formed in a headrest, and a false front wall is supported within the recessed support structure for movement from a recessed position adjacent a closed base wall of the recessed support structure and an exposed position covering an open top of the recessed support structure.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
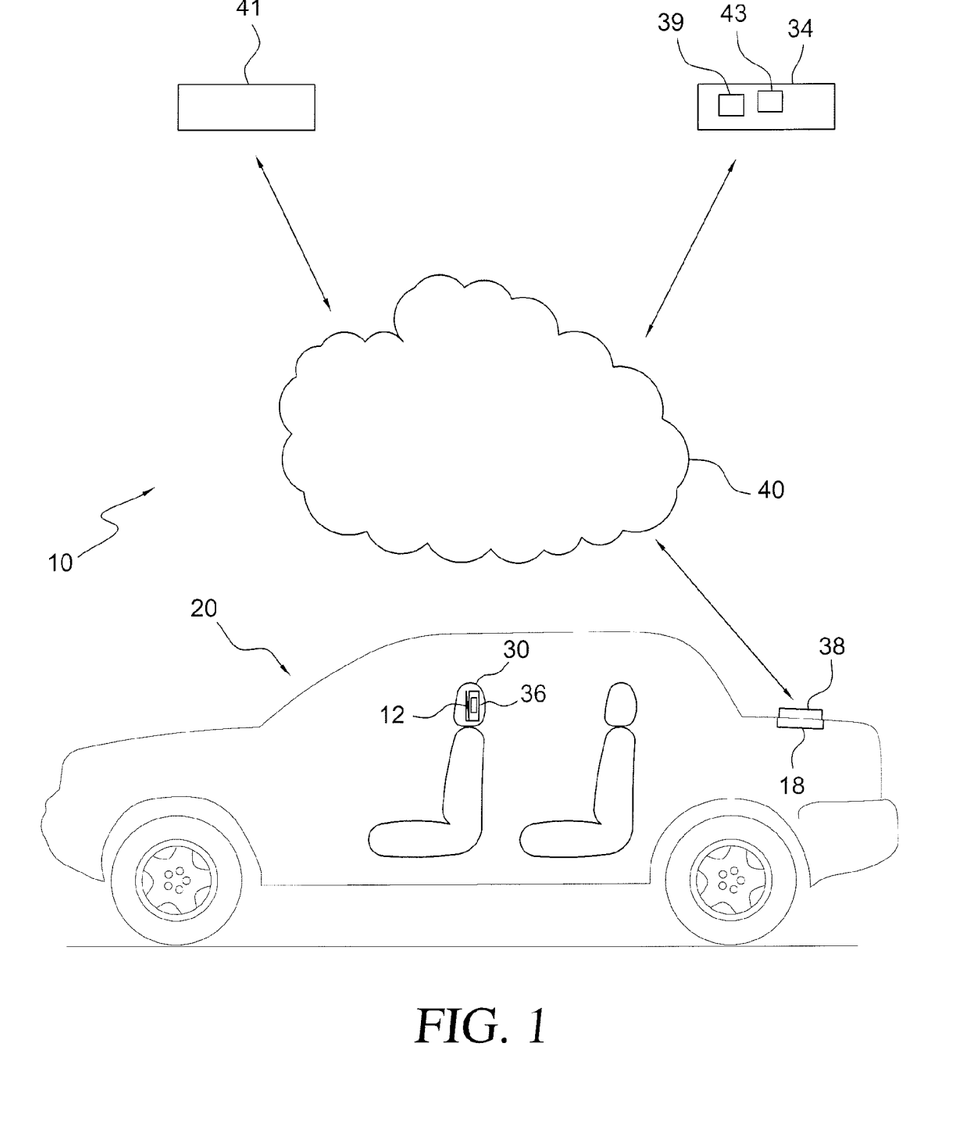
FIG. 1 is a schematic of the present mobile entertainment system.

With reference to FIG. 1, a mobile entertainment system 10 for use in automobiles is disclosed. Although the present mobile entertainment system 10 is particularly adapted and disclosed herein for use in conjunction with automobiles 20, the present entertainment system 10 may be utilized in conjunction with a wide variety of vehicles, for example, but not limited to, boats, aircrafts, etc., without departing from the spirit of the present invention.

The centerpiece of the present mobile entertainment system 10 is a video system 12 designed for reducing energy consumption. The reduced energy consumption of the present mobile entertainment system 10 allows for implementation thereof without the need for a direct wired connection to the power system of an automobile. In accordance with a preferred embodiment of the present invention, the power consumption of the video system is preferably less than approximately 2 Amps, more preferably less than approximately 1.5 Amps, and even more preferably less than approximately 0.5 Amps.

The video system 12 generally includes a housing 14 in which a monitor 16 is mounted for viewing by those utilizing the present mobile entertainment system 10. Media content for display upon the monitor 16 is wirelessly transmitted to the video system 12 via a media storage unit 18 mounted within the automobile 20, and discussed below in greater detail. As for the audio content, it is also wirelessly transmitted to the video system 12 for transmission to the user via speakers 22 built into the housing 14 of the video system 12 or via wired/wireless headphones linked to the video system 12. In addition, it is contemplated the audio content may be transmitted to the automobile speakers. Such an arrangement could be employed by directly wiring the media storage unit 18 to the automobile audio system or wirelessly linking the media storage unit 18 to the automobile audio system. As such, the video system 12 is provided with a wireless connection member, for example, a WiFi adapter allowing for transmission of media content between the media storage unit 18 and the video system 12.

The video system 12 is also provided with electronic components necessary for processing the media content retrieved from the media storage unit 18 for display upon the monitor 16 and play through the speakers/headphones. The video system 12 is also preferably provided with touch screen functionality allowing for ease of use without the need for additional buttons and control mechanisms. A battery 24 is provided for powering the present video system 12. As will be appreciated based upon the following disclosure, the battery 24 is designed for continual recharging via proximity charging, or inductive coupling or charging of the video system 12, in particular, the battery 24 of the video system 12 which ultimately powers the video system 12. In electronics, inductive coupling refers to the transfer of energy from one circuit component to another through a shared magnetic field. A change in current flow through one device induces current flow in the other device. The two devices may be physically contained in a single unit, as in the primary and secondary sides of a transformer, or may be separated as in the antennas on a transmitter and a receiver. Inductive coupling favors low frequency energy sources. High frequency energy sources generally use capacitive coupling.

In particular, and in accordance with a preferred embodiment of the present invention, a system such as that disclosed in U.S. Pat. No. 7,118,240, which is incorporated herein by reference, is employed. In accordance with a preferred embodiment of the present invention, power is wirelessly transferred from a primary coil (or simply "primary") 26, which is powered by the electrical system of the automobile 20 to a secondary coil (or simply "secondary") 28 in a secondary circuit housed in and electrically linked to the battery 24 of the video system 12.

In accordance with the application of inductive coupling to the present mobile entertainment system 10, the primary coil 26 of the power supply circuit is supported within a structural element of the automobile 20, for example, within an upper edge 74 of a seat back 72 in a position adjacent to the headrest 30 in which the video system is mounted, as discussed below in accordance with preferred embodiments of the present invention. The secondary coil 28 of the secondary circuit is mounted within the video system 12 and is electrically coupled with the battery 24 and other operating components of the video system 12 to provide the power necessary for operating the video system 12 in accordance with the present invention. In addition to facilitating ease of installation and use, the wireless connection provides a number of advantages over conventional hardwired connections. The wireless connection reduces the chance of shock and provides a relatively high level of electrical isolation between the power supply circuit and the secondary circuit of the video system 12. Inductive coupling also makes it easier for a consumer to replace limited-life components.

Implementation of the present mobile entertainment system through the utilization of proximity charging necessitates that energy consumption of the video system 12 be held to a minimum so the battery 24, in conjunction with its ability to allow for proximity charging, will be sufficient to provide for powering of the video system 12 in a manner permitting usage thereof as desired by passengers of the automobile 20 in which the present mobile entertainment system 10 is incorporated. With this in mind, the monitor 16 is preferably an organic LED. As those skilled in the art will appreciate, an organic light-emitting diode (OLED), also Light Emitting Polymer (LEP) and Organic Electro-Luminescence (OEL), is any light-emitting diode (LED) whose emissive electroluminescent layer is composed of a film of organic compounds. The layer usually contains a polymer substance that allows suitable organic compounds to be deposited. They are deposited in rows and columns onto a flat carrier by a simple "printing" process. The resulting matrix of pixels can emit light of different colors.

OLED displays do not require a backlight to function and consequently draw far less power and, when powered from a battery, can operate longer on the same charge. Because there is no need to distribute the backlight, the OLED monitor utilized in accordance with a preferred embodiment of the present invention can also be much thinner than traditional LCD panels.

Briefly, the OLED monitor 16 is composed of an emissive layer, a conductive layer, a substrate, and anode and cathode terminals. The layers are made of special organic polymer molecules that conduct electricity. Their levels of conductivity range from those of insulators to those of conductors, and so they are called organic semiconductors.

A voltage is applied across the OLED monitor 16 such that the anode is positive with respect to the cathode. This causes a current of electrons to flow through the OLED monitor from cathode to anode. Thus, the cathode gives electrons to the emissive layer and the anode withdraws electrons from the conductive layer; in other words, the anode gives electron holes to the conductive layer.

Soon, the emissive layer becomes negatively charged, while the conductive layer becomes rich in positively charged holes. Electrostatic forces bring the electrons and the holes towards each other and recombine. This happens closer to the emissive layer, because in organic semiconductors holes are more mobile than electrons (unlike in inorganic semiconductors). The recombination causes a drop in the energy levels of electrons, accompanied by an emission of radiation whose frequency is in the visible region. That is why this layer is called emissive.

Indium tin oxide is commonly used as the anode material. It is transparent to visible light and has a high work function which promotes injection of holes into the polymer layer. Metals such as aluminium and calcium are often used for the cathode as they have low work functions which promote injection of electrons into the polymer layer.

Just like passive-matrix LCD versus active-matrix LCD, OLED can be categorized into passive-matric OLED and active-matrix OLED. Active-matrix OLED requires a TFT backplane to switch ON/OFF the pixel and can make higher resolution and larger size display happen.

OLEDs enable a greater range of colors, brightness, and viewing angle than LCDs, because OLED pixels directly emit light. OLED pixel colors appear correct and unshifted, even as the viewing angle approaches 90 degrees from normal. LCDs use a backlight and cannot show true black, while an "off" OLED element produces no light and consumes no power. Energy is also wasted in LCDs because they require polarizers which filter out about half of the light emitted by the backlight. Additionally, color filters in color LCDs filter out two-thirds of the light. OLEDs also have a faster response time than standard LCD screens. Whereas a standard LCD currently has an average of 8-12 millisecond response time, an OLED can have less than 0.01 millisecond response time.

As discussed above, the media content for display upon the video system is not actually stored upon the video system 12 itself, but is rather stored within the media storage unit 18 and transmitted to the video system 12 via wireless transmission protocols known to those skilled in the art. For example, and referring to the various figures, the present mobile entertainment system 10 permits retrieval of audio and video media content from a remote library 34. Implementation of a preferred embodiment requires that the video system 12 include a media source 36. The media source 36 is housed within the housing 14 of the video system 12. The media source 36 includes data processing capabilities allowing for the streaming of media content for display upon the video system 12 as desired by a user.

A wireless global communication network access point 38 is mounted within the automobile 20 and is preferably integrated with the media storage unit 18. The media source 36 includes wireless communication capabilities permitting communication with the wireless global communication network access point 38 and media storage unit 18 for retrieval of video and audio content for display upon the video monitor 16 and speakers/headphones of the video system 12.

A remote library 34 of audio and video media content is in wireless communication with the media storage unit 18 (and ultimately the media source 36) via the network access point 38. The remote library 34 includes storage space 39 for uploading of media content from a personal collection of audio and video media content 41 stored, for example, on a home computer linked to the remote library 34 via the Internet. The uploaded personal collection of audio and video media content 41 from a user for subsequent transmission to the media storage unit 18 upon synchronization of the remote library 34 with the media storage unit 18 thereby provides the user with access to a personal collection of audio and video media content 41. An access approval code is associated with the media storage unit 18 instructing the remote library 34 to synchronize the personal collection of audio and video media content 41 with the media storage unit 18 as desired by the user. Once the personal collection of audio and video media content 41 is synchronized with the media storage unit 18, the media source 36 may retrieve media content from the media storage unit 18 for presentation upon the video system 12.

As briefly mentioned above, the media source 36 includes a storage medium upon which audio and video media content is stored, at least temporarily, for display upon the video monitor 16 of the video system 12 as desired by a user. For example, and in accordance with a preferred embodiment of the present invention, the media source 36 is a flash memory device upon which both audio and video content, as well as other viewable content, may be readily stored. However, and as those skilled in the art will certainly appreciate, the media source 36 may take a variety of forms as technology moves forward, without departing from the spirit of the present invention.

In addition to the provision of the media source 36 as described above for use in conjunction with the video system 12, the video system 12 may also be provided with a DVD player or other similar media player allowing the operator to play videos when those available via the media source described above are not desired.

The wireless global communication network access point 38 is mounted within the automobile 20 and is coupled to the media storage unit 18, which is in wireless communication with the media source 36 for the transfer of data therebetween. The wireless connection between the media source 36 and the media storage unit 18 may be achieved by various known protocols, for example, but not limited to WiFi. While a wireless connection between the network access point 38 and the media source 36 is disclosed in accordance with a preferred embodiment of the present invention, it is possible the utilization of a conventional wired connection might be more appropriate under certain circumstances and the use thereof would certainly fall within the spirit of the present invention. As storage capacity also increases, it is contemplated it may be possible to hold all of the media content within the video system 12, that is, the media source 36 of the video system 12. As such, and considering this possibility, the media storage unit 18 would be obsolete and the media source 36 would directly, and preferably wirelessly, communicate with the network access point 38.

In accordance with a preferred embodiment of the present invention, the wireless global communication network access point 38 provides users with access to a global communication network, for example, the Internet 40, for access to a variety of data sources in a real time, high-speed manner. The wireless global communication network 40 allows the media storage unit 18, to which it is connected via the wireless global communication network access point 38, to synchronize with the remote library 34.

With this in mind, and as briefly discussed above, the media storage unit 18 includes wired or wireless communication capabilities permitting communication with the wireless global communication network access point 38 for retrieval of audio and video media content from the remote library 34 for display upon the video monitor 16 of the video system 12. As will be appreciated based upon the present disclosure, the media storage unit 18 downloads information from the operator's personal collection of audio and video media content 41 or from a secure media source containing selected content maintained on the remote library 34 for storage therein and display upon the video monitor.

More specifically, a remote library 34 of audio and video media content is in wireless communication with the media storage unit 18 via the wireless global communication network access point 38. The remote library 34 includes storage space 39 for uploading of media content from a personal collection of audio and video media content 41 from a user for subsequent transmission to the media storage unit 18 upon synchronization of the remote library 34 with the media storage unit 18 thereby providing the user with access to a personal collection of audio and video media content 41.

As briefly mentioned above, an access approval code is associated with the media storage unit 18 instructing the remote library 34 to synchronize the audio and video media content with the media storage unit 18 as desired by the user. As a result, each time the media storage unit 18 is activated, or when desired by the operator under certain circumstances, the media storage unit 18 will communicate with the remote library 34 via the network access point 38 to ascertain whether additional audio or video content is available. If it is determined audio or video content is available for downloading, the content will either be downloaded to the media storage unit 18 automatically or the user will be provided with a prompt asking whether he or she wishes to have the audio and/or video content download to the media storage unit 18 for transmission to the media source 36 for viewing upon the monitor 16.

In addition to providing the user with access to a personal collection of audio and video media content, the remote library 34 of audio and video content may also provide the operator with access to selected content 43 he or she subscribes to through a predetermined subscription arrangement. For example, the operator may be provided with access to a certain level of video content (for example, old documentaries) through the provision of one subscription fee or the operator may be provided with access to another level of video content (for example, first run movies) through the provision of another subscription fee.

Although it is contemplated media content will not be permanently stored upon the video system and the media source will only facilitate the streaming of data between the media storage unit and the video system, it may desirable for some applications to allow storage of a substantial amount of media directly upon the video system. As such, the video system may further be provided with a large flash drive, hard drive or other data storage device which the criteria upon which the present invention is based permits.

As briefly discussed above, the video system 12 in accordance with the present invention is fully portable and may be carried from one location to another location. However, when the video system 12 is utilized with an automobile it will be important for the safety of all traveling within the automobile that the video system is securely supported within the automobile 20.

As such, a supporting structure 42 is provided for selectively supporting the video system 12 within the automobile 20. In accordance with a first embodiment, the supporting structure 42 is composed of a drawer 44 integrally formed with the headrest 30. The drawer 44 includes a base support 46 integrated within the headrest body 48 and a drawer member 50 that selectively moves from a closed/use position (see FIG. 2) within the base support 46 such that the entire drawer 44 is substantially flush with the rear surface 52 of the headrest 30 and an open/exchange position (see FIG. 3) where the drawer member 50 is withdrawn from the base support 46 for selective insertion of the video system 12 within the drawer 44, and ultimately within the headrest 30.

Figure 2:
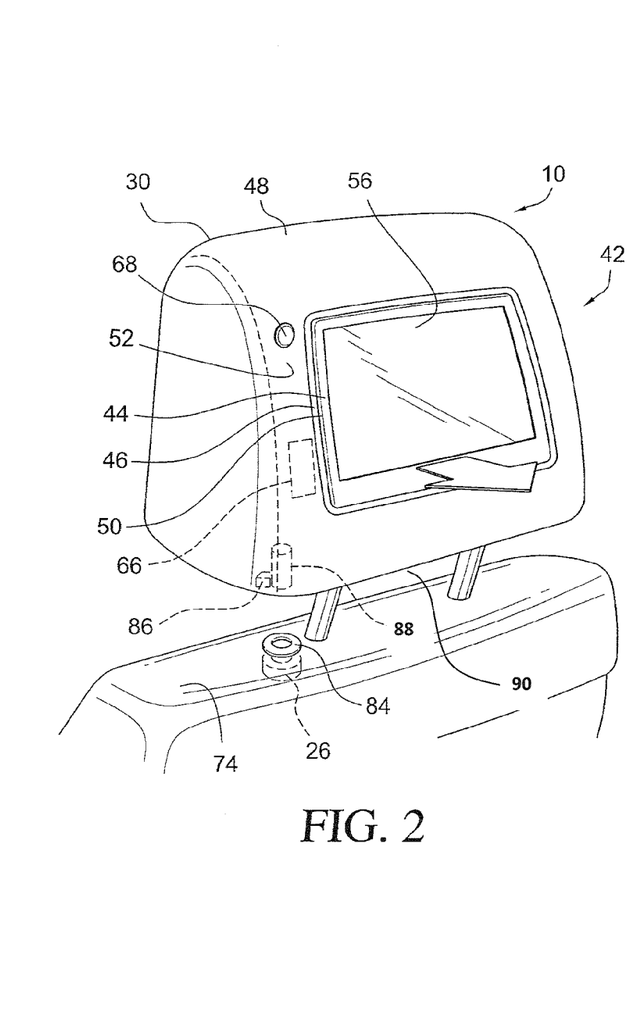
FIGS. 2 and 3 are perspective views of a first embodiment in accordance with the present invention.
Figure 3:
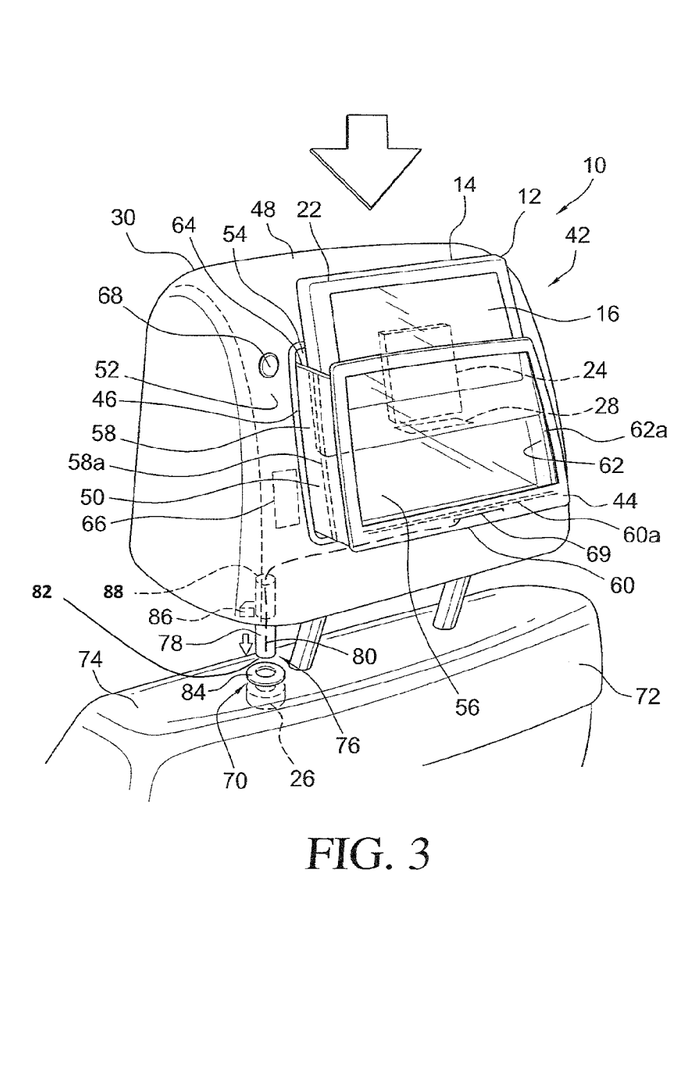

More particularly, the base support 46 is substantially rectangular and defines a central recess 54 shaped and dimensioned to receive the drawer member 50 and the video system 12. The drawer member 50 includes a transparent front wall 56 from which first, second and third sidewalls 58, 60, 62 extend for positioning within the recess 54 of the base support 46. The first, second and third sidewalls 58, 60, 62 are respectively positioned along the left side, bottom and right side of the front wall 56 leaving an insertion slot 64 along the top of the drawer member 50 that is shaped and dimensioned for receipt of the video system 12. Each of the first sidewall 58, second sidewall 60 and third sidewall 62 includes an alignment member 58a, 60a, 62a extending therefrom. The alignment members 58a, 60a, 62a are shaped and dimensioned to guide the video system 12 as it is inserted within the drawer 44.

Movement of the drawer member 50 relative to the base support 46 is controlled by a servomotor 66 that selectively moves the drawer member 50 between its closed position and its open position. Actuation of the servomotor 66 is preferably controlled by a switch 68 mounted on the headrest 30. Although a servomotor is disclosed in accordance with a preferred embodiment of the present invention, it is contemplated alternative automated and manual movement mechanisms may be utilized without departing from the spirit of the present invention.

In practice, the switch 68 is actuated to move the drawer member 50 to its open position exposing the insertion slot 64 for slipping the video system 12 within the drawer 44. The video system 12 is inserted within the drawer 44 such that the monitor 16 thereof is facing the transparent front wall 56 of the drawer member 50 for viewing by a passenger sitting within the rear seat of the automobile 20. Thereafter, the switch 68 is actuated again causing the drawer member 50 to move to its closed position.

Power is supplied to the video system 12 by providing an electrical connection 69 within the drawer 44 that links with video system 12 for transmitting power to the secondary coil 28 and battery 24 of the video system 12 via the inductive charging system 70 which links the primary coil 26 within the seat back 72 positioned at the upper edge 74 of the seat back 72 to the secondary coil 28 within the video system 12. To assist with the transfer of energy from the primary coil 26 (which is powered by the electrical system of the automobile) to the secondary coil 28, the drawer 44 is provided with a telescoping coupling member 76 that electrically links the secondary coil 28 of the video system 12 with the primary coil 26.

More particularly, the telescoping coupling member 76 is composed of a selectively telescoping arm 78 through which an electrical wire 80 extends for linking the distal end 82 of the telescoping arm 78 to the secondary coil 28 of the video system 12. In order to ensure that the telescoping arm 78 is drawn toward the primary coil 26, the distal end 82 of the telescoping arm 78 is magnetically charged for attraction to a magnetically charged shroud 84 of the primary coil 26. As such, when it is desired to power the video system 12, a latch mechanism 86 associated with the telescoping arm 78 is released in a manner allowing the telescoping arm 78 to move toward the primary coil 26 improving the efficiency of the inductive coupling between the secondary coil 28 of the video system 12 and the primary coil 26 within the seat back 72. When the user no longer wishes to use the video system 12, and the video system 12 no longer requires power, the telescoping arm 78 is pushed up into a recess 88 formed along the bottom 90 of the headrest 30 with the latch mechanism 86 holding it in this position.

Figure 4:
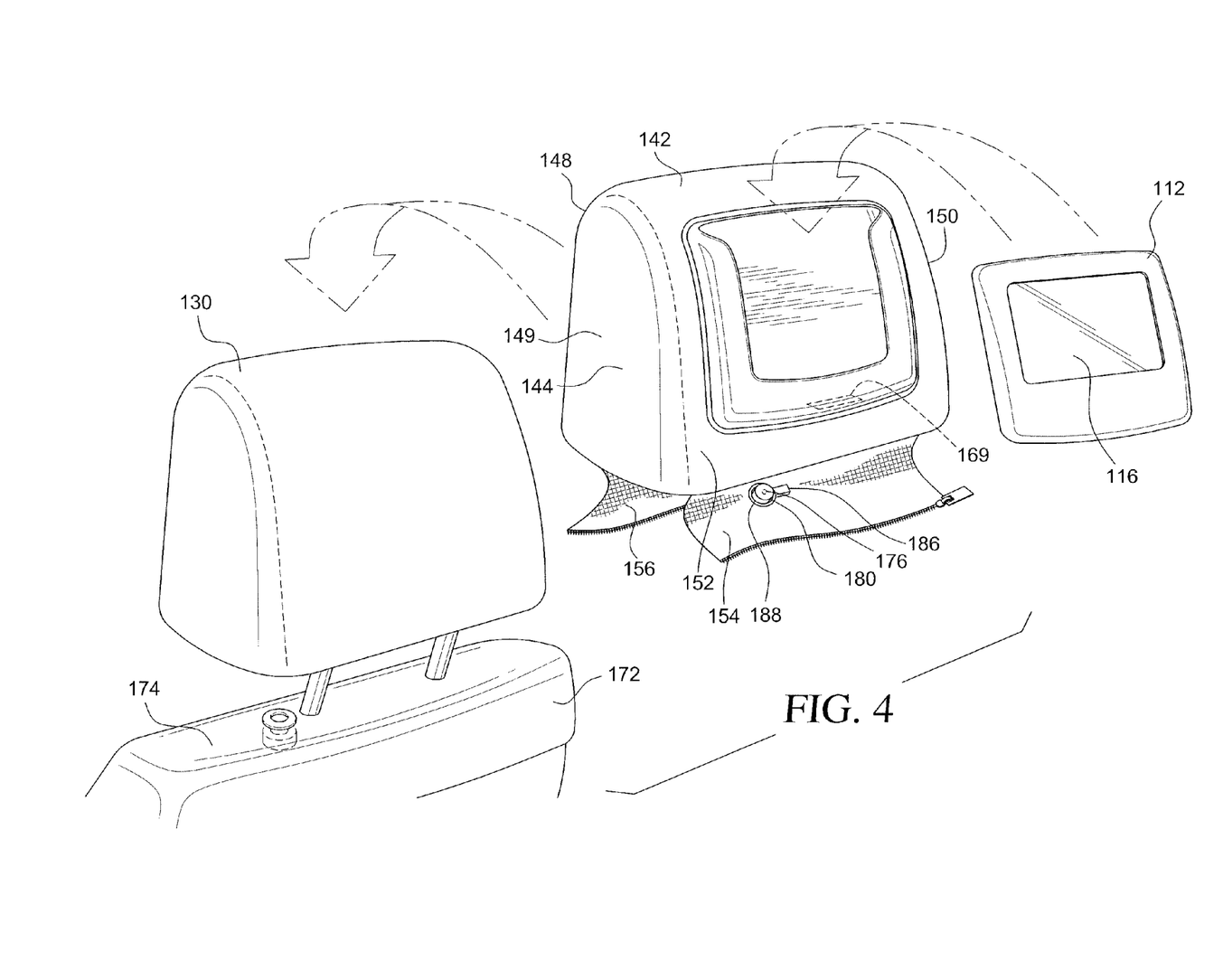
FIGS. 4, 5 and 6 are respectively an exploded view, a perspective view with the inductive charging system retracted and a perspective view with the inductive charging system extended in accordance with yet another embodiment in accordance with the present invention.
Figure 5:
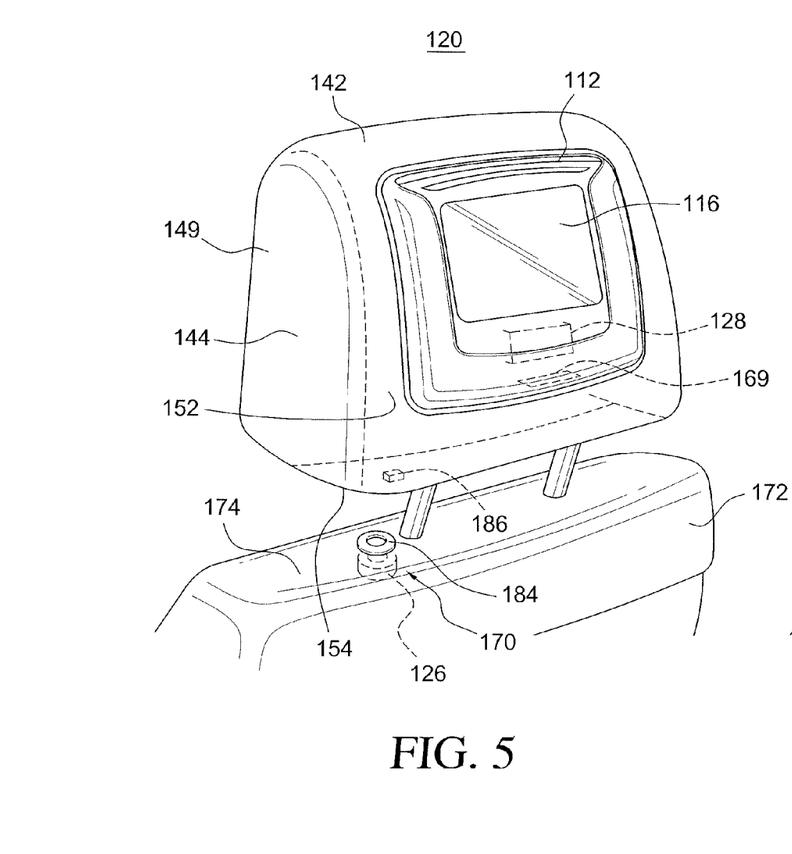
Figure 6:
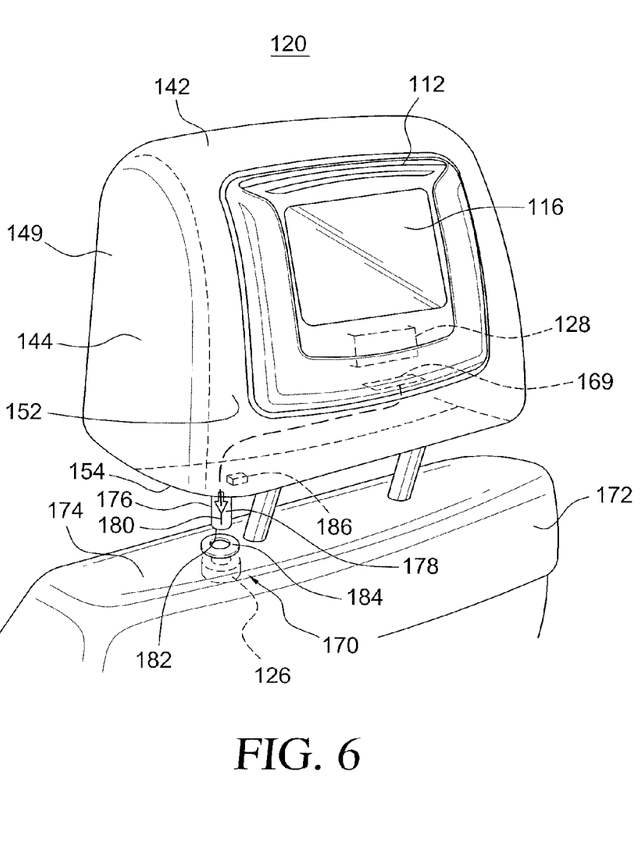

In accordance with a second embodiment, and with reference to FIGS. 4, 5 and 6, the video system 112 is not removable from the headrest 130, but is rather formed as part of a slip cover 142 shaped and dimensioned to fit over the headrest 130 with the video monitor 116 facing rearwardly for viewing by automobile passengers sitting within the rear seat of the automobile 120. More particularly, the slipcover 142 is composed of a fabric base structure 144 shaped and dimensioned to fit over the headrest 130. The fabric base structure 144 includes a front wall 148, first and second sidewalls 149, 150, a rear wall 152, and a bottom wall 154. In order to facilitate the selective positioning of the fabric base structure 144 over the headrest 130, the bottom wall 154 of the fabric base structure 144 is provided with a zipper 156 allowing for expansion and closure of the bottom wall 154 to allow the fabric base structure 144 to fit over the headrest 130.

A video monitor 116 is mounted along the rear wall 152 of the fabric base structure 144 for pivotal movement allowing adjustment for viewing by a passenger sitting in a rear seat of the automobile 120. The electronic components relating to the powering and functioning of the video monitor are mounted within fabric base structure 144.

As with the embodiment described above with reference to FIGS. 1 to 3, power is supplied to the video system 112 by providing an electrical connection 169 within slip cover 142 that links with video system 112 for transmitting power to the video system 112 via the inductive charging system 170 which links the primary coil 126 within the seat back 172 positioned at the upper edge 174 of the seat back 172 to the secondary coil 128 within the video system 112. To assist with the transfer of energy from the primary coil 126 to the secondary coil 128, the bottom wall 154 is provided with a telescoping coupling member 176 that electrically links the secondary coil 128 of the video system 112 with the primary coil 126.

More particularly, the telescoping coupling member 176 is composed of a selectively telescoping arm 178 through which an electrical wire 180 extends for linking the distal end 182 of the telescoping arm 178 to the secondary coil 128 of the video system 112. In order to ensure that the telescoping arm 178 is drawn toward the primary coil 126, the distal end 182 of the telescoping arm 178 is magnetically charged for attraction to a magnetically charged shroud 184 of the primary coil 126. As such, when it is desired to power the video system 112, a latch mechanism 186 associated with the telescoping arm 178 is released in a manner allowing the telescoping arm 178 to move toward the primary coil 126 improving the efficiency of the inductive coupling between the secondary coil 128 of the video system 112 and the primary coil 126 within the seat back 172. When the user no longer wishes to use the video system 112, and the video system 112 no longer requires power, the telescoping arm 178 is pushed up into a recess 188 formed along the bottom wall 154 of the fabric base structure 144 of the headrest 130 with the latch mechanism 186 holding it in this position.

In accordance with yet a further embodiment of the present invention, a snap fit mechanism 242 is implemented for selective mounting of the video system 212 within the headrest 230. More particularly, and with reference to FIGS. 7 to 10, the snap fit mechanism 242 includes a recessed support structure 244 into which the video system 212 is snap fit in accordance with the present invention.

The recessed support structure 244 includes a base support 246 that is fit within a recess formed in a headrest 230. The recessed support structure 244 includes a closed base wall 248, first, second, third, and fourth sidewalls 250, 252, 254, 256 extending from a perimeter edge of the closed base wall 248, and an open top 258 shaped and dimensioned for receipt of a video system 212 in accordance with a preferred embodiment and as discussed below in greater detail.

Figure 7:
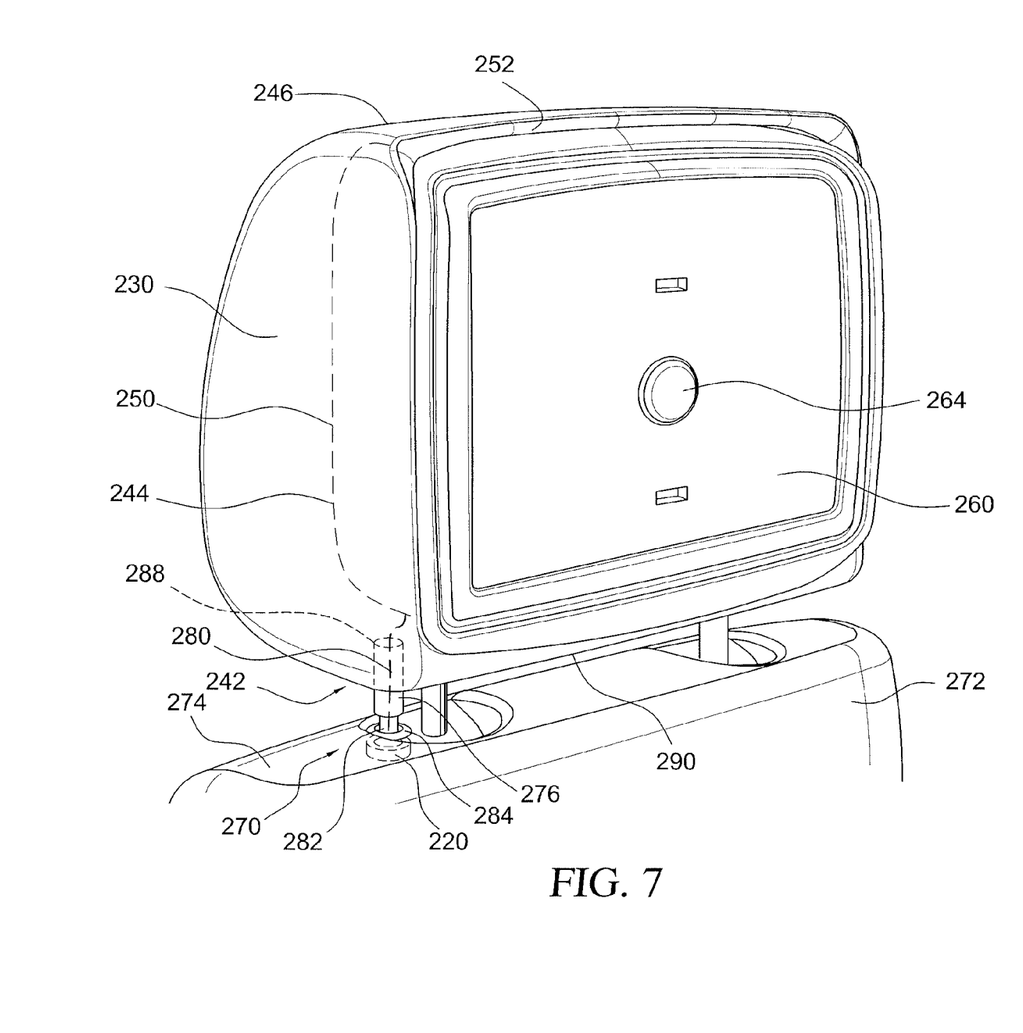
FIGS. 7, 8, 9 and 10 are respectively a perspective view and a partial cross sectional view thereof, and a perspective view and a partial cross sectional view thereof showing another embodiment in accordance with the present invention.
Figure 8:
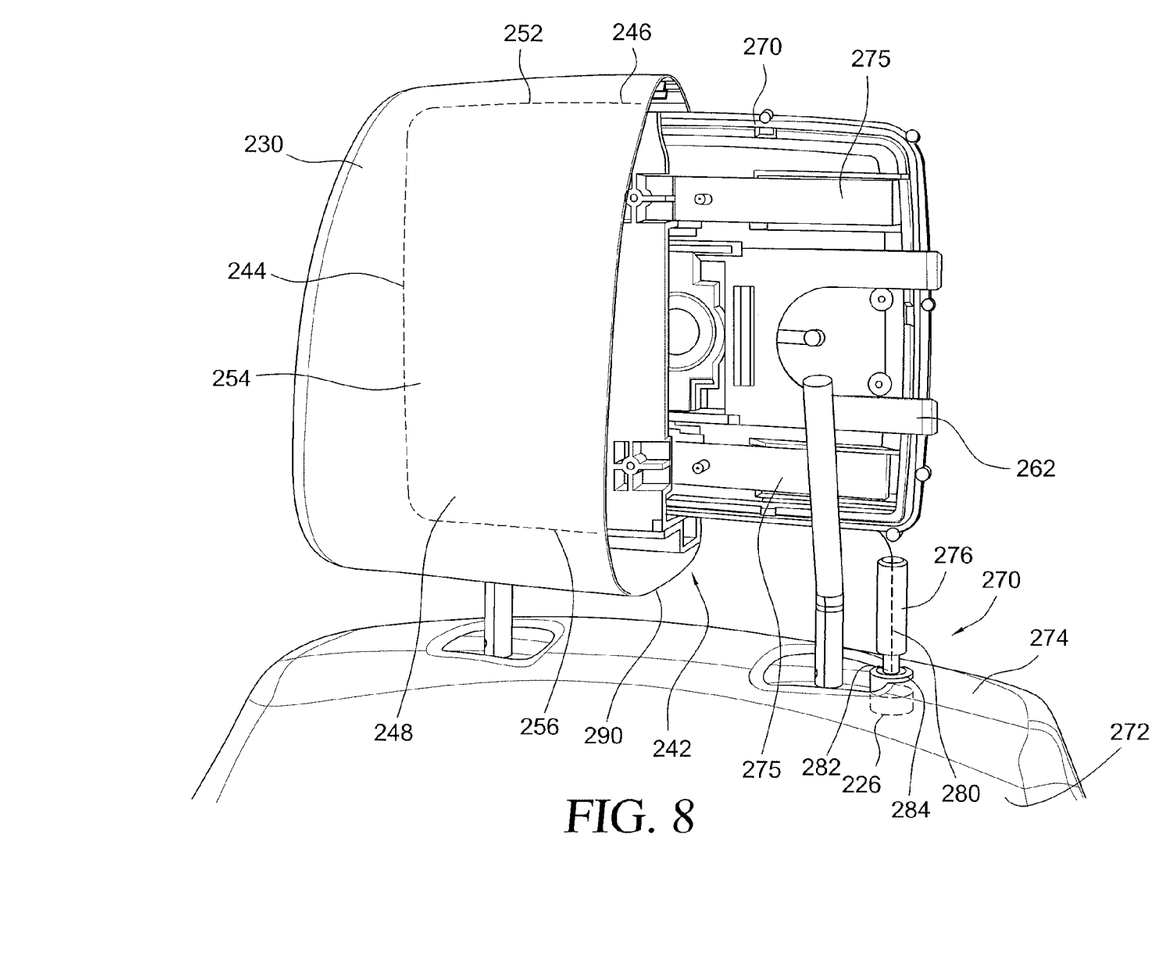

A false front wall 260 is supported within the recessed support structure 244 for movement from a recessed position adjacent the closed base wall 248 (see FIGS. 9 and 10) to an exposed position covering the open top 258 when the device is not in use (see FIGS. 7 and 8). As such, the false front wall 260 is maintained in an orientation such that the plane in which the false front wall 260 lies is substantially parallel to the plane in which the closed base wall 248 lies.

Figure 9:
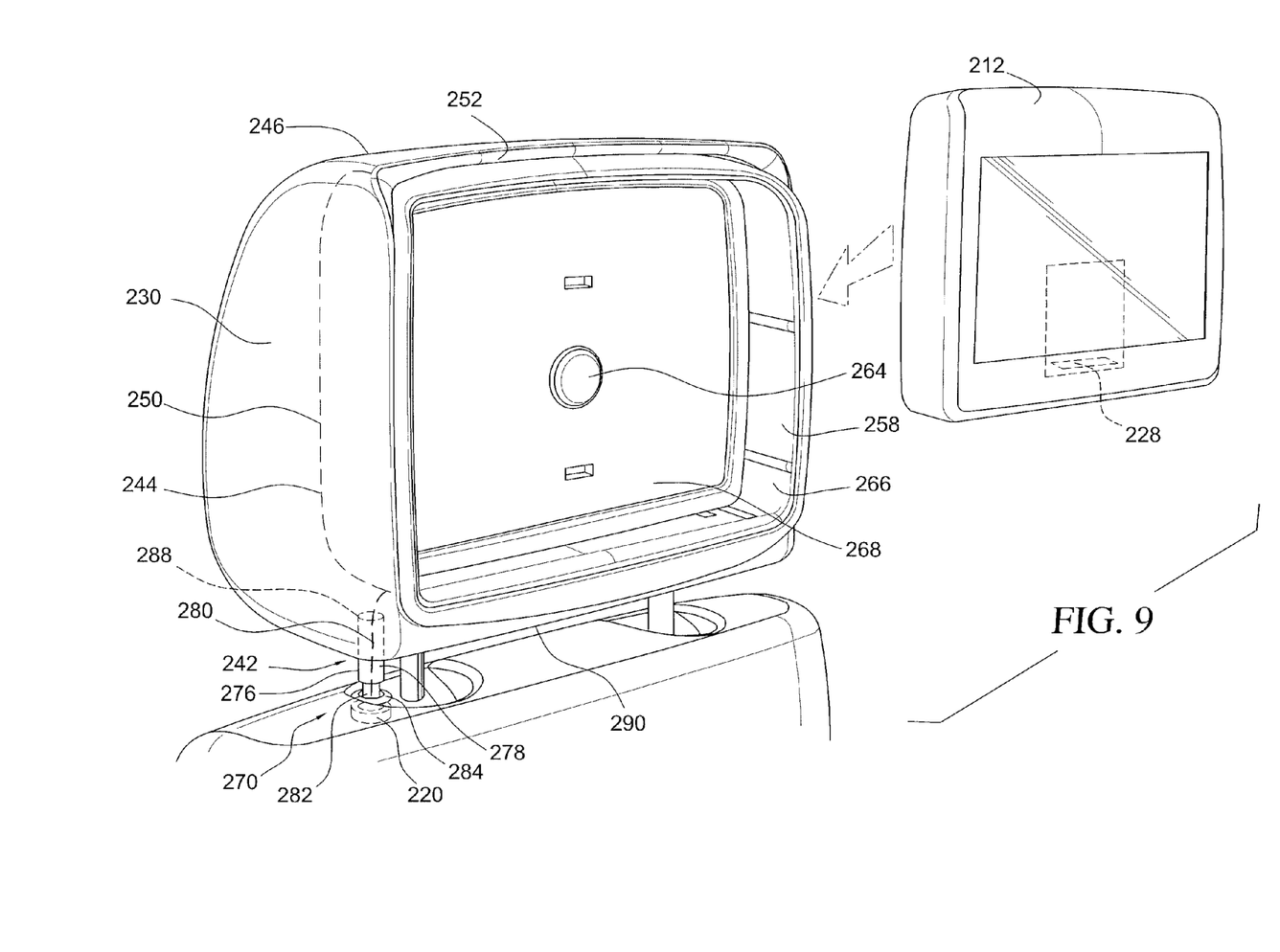
Figure 10:
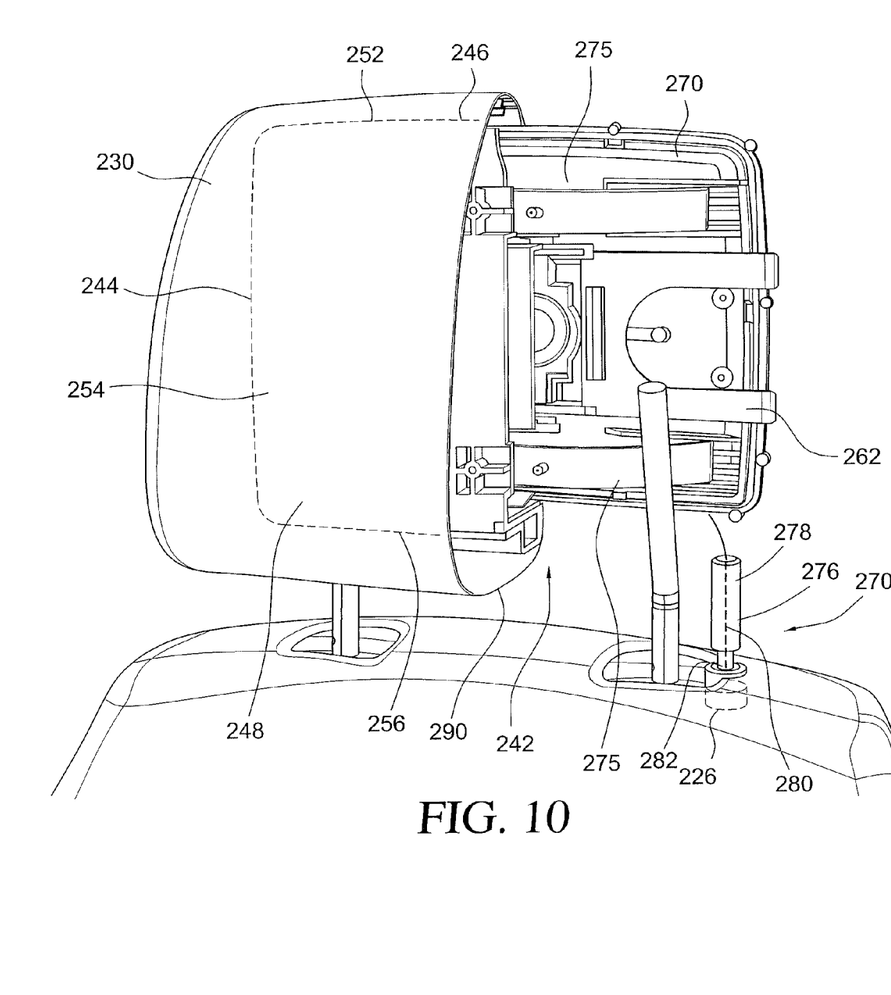

Controlled movement of the false front wall 260 is facilitated by sliding spring arms 272 that extend between the closed base wall 248 and the rear surface 270 of the false front wall 260. The sliding spring arms 272 are biased to force the false front wall 260 to its exposed position as shown with reference to FIGS. 7 and 8. When rearward force is applied to the false front wall 260, the bias of the sliding spring arms 272 is overcome and the false front wall 260 is moved to its recessed positioned as shown in FIGS. 9 and 10.

In practice, the spring biased nature of the false front wall 260 allows a user to move the false front wall 260 from its exposed position to its recessed position by simply applying a slight force to the false front wall 260 toward its recessed position and forcing it toward the closed base wall 248. When the false front wall 260 reaches its recessed position latches 262 within the recessed support structure 244 extend between the false front wall 260 and the base support 246 to hold the false front wall 260 in its recessed position. Actuation of the latches 262 is achieved by a central button 264 positioned along the false front wall 260 that upon pressing releases the latches 262 to allow movement of the false front wall 260. Similarly, the latches 262 securely hold the false front wall 260 in its exposed position until such a time that a user wishes to move it inwardly toward its recessed position.

Once the false front wall 260 is moved to its recessed position, the cavity 266 defined by the base support 246 is available for receiving the video system 212 in accordance with the present invention. The video system 212 is simply slipped into the cavity 266 and held in position by conventional coupling mechanisms. Removal of the video system 212 is achieved by simply reversing the steps outlined above.

As with the embodiments described above with reference to FIGS. 1 to 4, power is supplied to the video system by providing an electrical connection within recessed support structure 244 that links with video system 212 for transmitting power to the video system 212 via the inductive charging system 270 which links the primary coil 226 within the seat back 272 positioned at the upper edge 274 of the seat back 272 to the secondary coil 228 within the video system 212. To assist with the transfer of energy from the primary coil 226 to the secondary coil 228, the bottom of the headrest 230 is provided with a telescoping coupling member 276 that electrically links the secondary coil 228 of the video system 212 with the primary coil 226.

More particularly, the telescoping coupling member 276 is composed of a selectively telescoping arm 278 through which an electrical wire 280 extends for linking the distal end 282 of the telescoping arm 278 to the secondary coil 228 of the video system 212. In order to ensure that the telescoping arm 278 is drawn toward the primary coil 226, the distal end 282 of the telescoping arm 278 is magnetically charged for attraction to a magnetically charged shroud 284 of the primary coil 226. As such, when it is desired to power the video system 212, a latch mechanism 286 associated with the telescoping arm 278 is released in a manner allowing the telescoping arm 278 to move toward the primary coil 226 improving the efficiency of the inductive coupling between the secondary coil 228 of the video system 212 and the primary coil 226 within the seat back 272. When the user no longer wishes to use the video system 212, and the video system 212 no longer requires power, the telescoping arm 278 is pushed up into a recess 288 formed along the bottom wall 290 of the headrest 230 with the latch mechanism 286 holding it in this position.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A mobile entertainment system, comprising:
  a video system designed for reducing energy consumption, the video system including a battery permitting proximity charging of the video system; and
  a supporting structure supporting the video system within a vehicle, wherein:
    a secondary coil is electrically linked to the battery of the video system for inductive coupling with a primary coil coupled to a power supply circuit of the vehicle,
    a coupling member electrically links the secondary coil of the video system with the primary coil,
    the coupling member is composed of an arm through which an electrical wire extends for linking a distal end of the arm to the secondary coil of the video system, and
    the distal end of the arm is magnetically charged for attraction to a magnetically charged shroud mounted within the vehicle and linked to the primary coil, wherein the arm is a selectively telescoping arm through which the electrical wire extends, is positioned in a headrest of a vehicle seat, and is distinct from a support post of the headrest.

2. The mobile entertainment system according to claim 1, wherein the power consumption of the video system is less than approximately 2 Amps.

3. The mobile entertainment system according to claim 2, wherein the power consumption of the video system is less than approximately 0.5 Amps.

4. The mobile entertainment system according to claim 1, wherein the video system includes a housing in which a monitor is mounted for viewing by those utilizing the mobile entertainment system, and media content for display upon the monitor is wirelessly transmitted to the video system via a media storage unit mounted within the vehicle.

5. The mobile entertainment system according to claim 1, wherein the video system is provided with touch screen functionality.

6. The mobile entertainment system according to claim 1, wherein the primary coil is mounted in the seat back of the vehicle in proximity to the secondary coil.

7. The mobile entertainment system according to claim 6, wherein the video system is mounted within a headrest of the vehicle.

8. The mobile entertainment system according to claim 1, wherein the video system includes a housing in which a monitor is mounted for viewing by those utilizing the mobile entertainment system, and the monitor is an organic LED.

9. The mobile entertainment system according to claim 1, wherein the supporting structure allows for selective supporting of the video system within the vehicle.

10. The mobile entertainment system according to claim 9, wherein the supporting structure is composed of a drawer integrally formed with the vehicle.

11. The mobile entertainment system according to claim 10, wherein the drawer is integrally formed within a headrest of the vehicle.

12. The mobile entertainment system according to claim 10, wherein the drawer includes a transparent front wall.

13. The mobile entertainment system according to claim 10, wherein the drawer includes a base support and a drawer member, and movement of the drawer member relative to the base support is controlled by a servomotor that selectively moves the drawer member between its closed position and its open position.

14. The mobile entertainment system according to claim 1, wherein the supporting structure is a slipcover shaped and dimensioned to fit over a headrest.

15. The mobile entertainment system according to claim 14, wherein the slipcover is composed of a fabric base structure shaped and dimensioned to fit over the headrest, and includes a zipper allowing for expansion and closure to allow the fabric base structure to fit over the headrest.

16. The mobile entertainment system according to claim 1, wherein the supporting structure is a recessed support structure into which the video system is snap fit.

17. The mobile entertainment system according to claim 16, wherein the recessed support structure includes a base support that is fit within a recess formed in a headrest, and a false front wall is supported within the recessed support structure for movement from a recessed position adjacent a closed base wall of the recessed support structure and an exposed position covering an open top of the recessed support structure.

18. The mobile entertainment system according to claim 1, wherein the arm is adjacent the support post of the headrest.

19. The mobile entertainment system according to claim 1, wherein the arm is held in a recess in the headrest by a latch positioned in the headrest.

20. The mobile entertainment system according to claim 19, wherein the latch is releasable to allow the arm to protrude from a bottom surface of the headrest.

21. The mobile entertainment system according to claim 1, wherein the shroud is positioned on a top surface of a seat opposing a bottom surface of the headrest.

22. The mobile entertainment system according to claim 1, wherein the shroud includes an opening that is large enough to allow the arm to be inserted through the opening of the shroud.

* * * * *